United States Patent
Lincoln et al.

(10) Patent No.: US 7,706,378 B2
(45) Date of Patent: Apr. 27, 2010

(54) METHOD AND APPARATUS FOR PROCESSING NETWORK PACKETS

(75) Inventors: Patrick Denis Lincoln, Woodside, CA (US); Steven Mark Eker, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 987 days.

(21) Appl. No.: 10/800,890

(22) Filed: Mar. 15, 2004

(65) Prior Publication Data
US 2004/0179477 A1  Sep. 16, 2004

Related U.S. Application Data

(60) Provisional application No. 60/454,935, filed on Mar. 13, 2003.

(51) Int. Cl.
*H04L 12/56* (2006.01)

(52) U.S. Cl. .......... 370/394; 370/229; 370/395.1; 370/428; 370/241

(58) Field of Classification Search .......... 370/229, 370/230, 230.1, 394, 395.1, 428, 429, 241
See application file for complete search history.

(56) References Cited

U.S. PATENT DOCUMENTS

| | | | | |
|---|---|---|---|---|
| 6,359,877 | B1 * | 3/2002 | Rathonyi et al. | 370/349 |
| 6,981,158 | B1 * | 12/2005 | Sanchez et al. | 726/2 |
| 7,068,595 | B2 * | 6/2006 | Perlman et al. | 370/218 |
| 2002/0075873 | A1 * | 6/2002 | Lindhorst-Ko et al. | 370/394 |
| 2002/0147722 | A1 * | 10/2002 | Banerjee | 707/100 |
| 2002/0150043 | A1 * | 10/2002 | Perlman et al. | 370/225 |
| 2003/0128704 | A1 * | 7/2003 | Mizrachi et al. | 370/394 |
| 2004/0100963 | A1 * | 5/2004 | Guo | 370/394 |
| 2004/0179486 | A1 * | 9/2004 | Agarwal et al. | 370/316 |
| 2006/0212572 | A1 * | 9/2006 | Afek et al. | 709/225 |

* cited by examiner

*Primary Examiner*—Kwang B Yao
*Assistant Examiner*—Nguyen Ngo

(57) ABSTRACT

A method and apparatus for monitoring and detecting strings of interest to effect intrusion detection, packet filtering, load balancing, routing, and other network-related operations.

51 Claims, 3 Drawing Sheets

METHOD AND APPARATUS FOR PROCESSING NETWORK PACKETS

CROSS-REFERENCE TO RELATED APPLICATIONS

This application claims benefit of U.S. provisional patent application Ser. No. 60/454,935, filed Mar. 13, 2003, which is herein incorporated by reference.

BACKGROUND OF THE INVENTION

1. Field of the Invention

The present invention relates to computer networks. More specifically, the present invention relates to a method and apparatus for monitoring and detecting strings of interest to effect intrusion detection, packet filtering, load balancing, routing, and other network-related operations as disclosed below.

2. Description of the Related Art

Network packets, e.g., those involved in TCP/IP or UDP communications, are routinely split into network datagrams for transmission on a network medium. Standard methods for performing intrusion detection, packet filtering, load balancing, routing, and other network-related operations involve the reassembly of network datagrams into network packets in order to make decisions based on the contents of the packet. As the splitting of packets can occur when each higher-layer in the network stack passes its data to a lower-layer, such reconstruction may be applied at any of such reconstructive boundaries, for example: IP packets being split into network datagrams, TCP packets being split into IP packets, HTTP packets being split into TCP packets, and others as will be clear to those skilled in the art.

Many of such decisions involve searching for particular strings that occur in the monitored network packets. To perform network monitoring, it is often necessary to completely reassemble higher layer (e.g., TCP/IP) packets from the monitored network datagrams in order to effectively match the strings of interest. This is necessary in order to counteract malicious avoidance of the monitoring system by splitting the strings between packets, and the out of order arrival of packets belonging to a particular network activity. However, reassembly of packets requires significant processing and storage, such that traditional methods are unable to scale cost-effectively to modern high-speed networks. Further, by malicious act, the monitoring system may be forced to retain large amounts of state, resulting in a denial of service attack.

Thus, there is a need for a method and apparatus for monitoring and detecting strings of interest to effect intrusion detection, packet filtering, load balancing, routing, and other network-related operations without the need to completely reassemble higher layer packets.

SUMMARY OF THE INVENTION

In one embodiment, the present invention discloses a method and apparatus for monitoring and detecting strings of interest to effect intrusion detection, packet filtering, load balancing, routing, and other network-related operations without the need to completely reassemble higher layer packets. Specifically, the present invention described herein relates to methods for monitoring, repairing, and responding to network activity based on a string-matching method that finds all occurrences of words from a given finite language in a sequence of datagrams, where blocks of data may arrive out-of-order. It has utility in performing content analysis on TCP/IP streams without either TCP stream reassembly or IP datagram reassembly. It has further utility in performing error-tolerant string matching: for fixed-vocabulary streams, the present invention can repair packets, or completely patch in missing packets from a sequence of datagrams, thereby preventing the recipient of a communication from requesting retransmission of missing parts of the sequence.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

The present invention relates to computer networks. More specifically, the present invention relates to a method and apparatus for monitoring and detecting strings or substrings of interest to effect intrusion detection, packet filtering, load balancing, routing, and other network-related operations as disclosed below.

Figure 1:
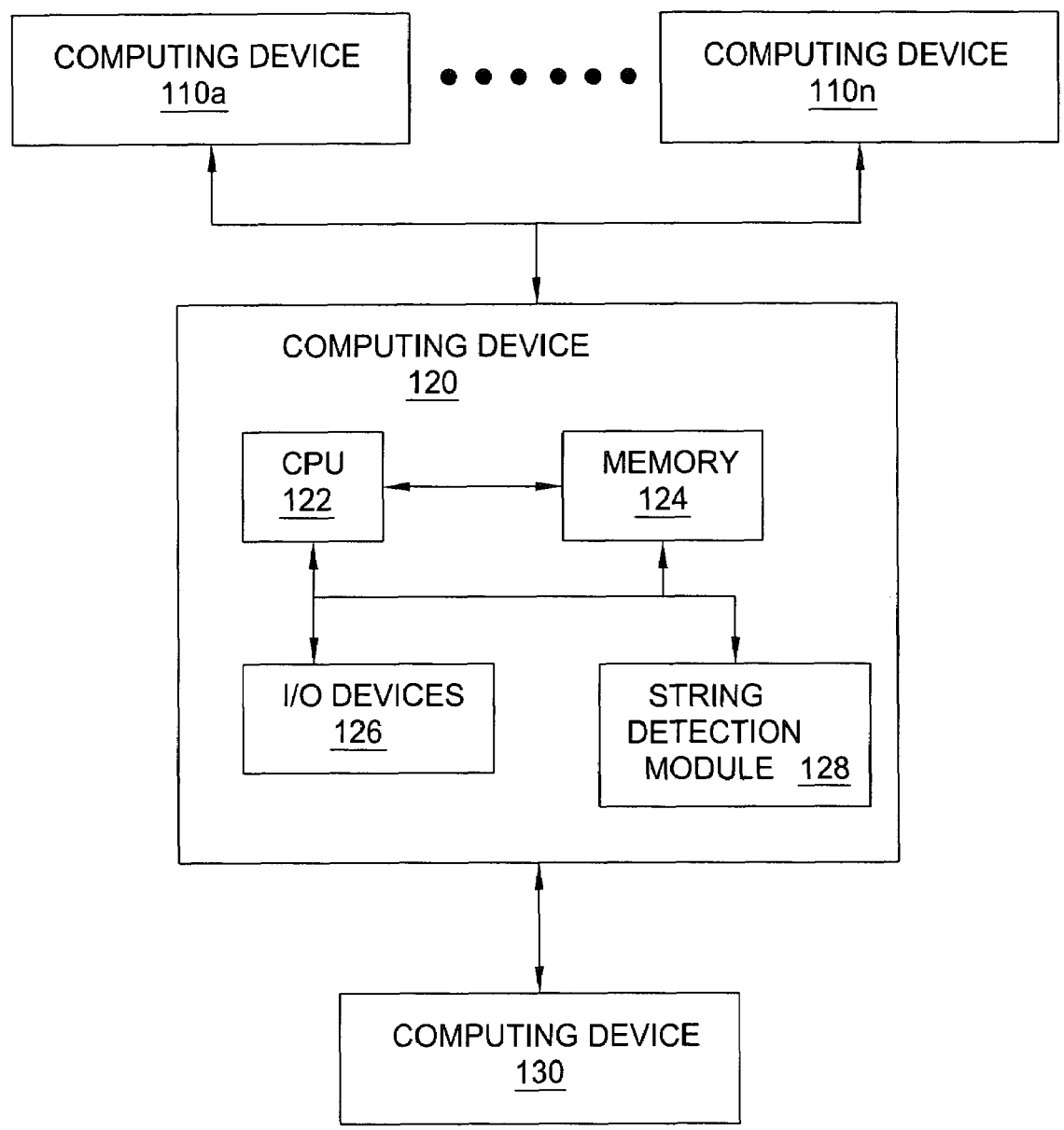
FIG. 1 illustrates a block diagram of a network of the present invention.

FIG. 1 illustrates a block diagram of an exemplary network 100 of the present invention. FIG. 1 illustrates a plurality of computing devices 110-130 (e.g., general purpose computers, work stations, servers, storage devices, PDAs, and other computing devices in general) that are organized into a network.

Computing device 120 is illustrated as having a central processing unit (CPU) or a controller 122, a memory 124, a plurality of input/output (I/O) devices 126 and a string detection module 128. The input/output (I/O) devices 126 may comprise storage devices (e.g., a tape drive, a floppy drive, a hard disk drive or a compact disk drive), a receiver, a transmitter, a speaker, a display, an image capturing sensor, a clock, an output port, a user input device (such as a keyboard, a keypad, a mouse, and the like, or a microphone for capturing speech commands), and the like. It should be understood that the string detection module 128 can be implemented as one or more physical devices that are coupled to the CPU 122 through a communication channel. Alternatively, the string detection module 128 can be represented by one or more software applications (or even a combination of software and hardware, e.g., using application specific integrated circuits (ASIC)), where the software is loaded from a storage medium, (e.g., a magnetic or optical drive or diskette) and operated by the CPU 122 in the memory of the computing device. As such, the string detection module 128 (including associated data structures) of the present invention can be stored on a computer readable medium, e.g., RAM memory, magnetic or optical drive or diskette and the like. Additionally, although computing devices 110a-n and 130 are not shown with a processor, a memory, a plurality of input/output (I/O) devices and a string detection module, it should be noted that these computing devices can deploy these components as well.

In the illustrative embodiment of FIG. 1, computing device 120 is deposed between computing device 130 and the plurality of computing devices 110a-n. Thus, as disclosed in greater detail below, computing device 120 can be deployed as an intrusion detection system, a firewall, a router, a switch, a load balancer, an anti-virus filter, an anti-spam filter, a document control system, a web content filter, one or more virtual private network devices, one or more SAN security devices and the like. A brief description is provided below as to how the present string matching can be advantageously employed in each of these embodiments. Thus, the architecture as shown in FIG. 1 is only illustrative of the present invention and should not be interpreted as limiting the present invention to this particular configuration.

In intrusion detection, the strings of interest correspond to signatures of malicious activity, intended to perform such actions as buffer overflows in applications, to confuse the network stack and so on. Malicious actors often employ deliberate tricks of splitting the malicious string over several network datagrams, or forcing the datagrams to arrive out of order, in an attempt to avoid detection by such a monitor.

Actions and responses in intrusion detection systems could involve reporting the matched strings to a monitoring console, or to a correlation engine, for example as described in U.S. Pat. No. 6,484,203 to Porras et al, and assigned to the assignee of the present invention and herein incorporated by reference. Further responses include terminating the connection on matching a string, for example by transmitting a TCP reset (RST) packet or an ICMP message.

In a firewall, the goal is to prevent certain network flows from entering a protected network. Traditional methods either involve the reconstruction of complete application-layer packets, and performing allow/deny decisions based on analysis thereof, or reassembly to just the transport layer (e.g., TCP or UDP) and performing allow/deny decisions based on port numbers and other network address information, according to a predefined security policy.

Clearly therefore, firewalls suffer from the same overheads of packet reconstruction as previously described. According to the present invention, the present invention can make allow/deny decisions based on individual network datagrams, by monitoring for strings defined in accordance with the predefined security policy. The allow/deny decisions are then based on a per received datagram basis. Although parts of a higher-level network packet will be allowed to pass the firewall, the present invention advantageously allows the firewall to block merely the last datagram that completes a match for one of the predetermined strings, and optionally perform a further response action, such as resetting a connection, raising an alarm, or invoking countermeasures. As the destination of the communication requires all of the network datagrams in order to completely reconstruct the (malicious) network packet, by blocking one, the present invention can prevent such reconstruction and thereby prevent any possible damage to the destination computer.

Routers and switches monitor the contents of network packet "header" information in order to make decisions regarding where to retransmit the received network packet. Some switches operate at the datagram level, but these types of switches perform merely low-level operations, usually on Ethernet frames, in order to transmit the frame to the intended destination network link.

More capable and intelligent routers and switches involve making decisions at higher levels of the network stack, and reconstruct the higher level packets from the underlying network datagrams to perform this operation. The present invention can be advantageously employed in routers and switches to monitor for strings according to a switching or routing policy, and action taken in the form of retransmitting the datagram on the appropriate outbound network link or links.

In cases where one of the strings being monitored for, that forms the basis of a routing or switching decision, is found only in a first datagram of a network packet, it is possible for the later datagrams to arrive before the first datagram of the network packet. One could buffer these later datagrams in memory until the first datagram (the decision point) arrives. According to the present invention, and the underlying concepts of making per-datagram decisions, one could route or switch the early, arriving datagrams on all network links.

Load balancing devices are similar to routers, with the additional constraint in the routing decision to balance the load across multiple devices that perform similar functions. For example, in Web-server load balancing systems, the decision may in part be based upon a URL contained in a request for a web page. Reconstructing application layer packets, such as HTTP protocol packets, to perform this decision making can be avoided by employing the present invention to monitor for strings, such as fragments or prefixes of URLs in the case of a Web-server load balancing system.

Many modern virus detection programs utilize signatures to detect the presence of a particular virus in a file. String matching according to the present invention can be used to perform anti-virus filtering without the requirement to reassemble the whole file (as represented in the network stream), by monitoring for strings commonly occurring in virus infected files. The present invention could be utilized to monitor, report and eliminate viruses at any point in the network, for example at a firewall, gateway, router, switch, or on a server or desktop computer.

The removal of unsolicited commercial email, commonly referred to as spam, is another potential utility of the present invention. Many spam messages have distinct strings in their content or message headers that enable them to be differentiated from legitimate electronic mail. The present invention could be utilized to monitor, report and eliminate certain spam messages at any point in the network, for example at a firewall, gateway, router, switch, or on a server or desktop computer.

Document control systems are, in one aspect, used to monitor the infiltration and exfiltration of information. By using the present invention to monitor network traffic for strings indicating confidential handling requirements for a document, topic material, or other marking of interest, the malicious or accidental transmittal of such documents outside an organizational unit may be prevented.

Web content filters are devices that remove potentially harmful content requested by users (with or without their explicit consent) during a browser session. Such content includes, but is not limited to, Java applets, JavaScript programs, and Visual Basic scripts. Further filtering may be performed based on objectionable content according to some policy, for example prohibiting the viewing of pornographic material, or visiting particular Web sites.

The present invention can be utilized in monitoring virtual private networks, and other devices such as SSL accelerators that involve the use of cryptography to secure communications between two or more parties. The packet-monitoring phase of the method can be extended to include the decryption of the monitored packet, if the key for decrypting is available to the monitor.

SANs (Storage Area Networks) tend to use fibre channel based networking, which is faster than many traditional forms of networks and hence traditional security monitoring and response systems are unable to perform effectively.

There are several points of security concern in a standard SAN: Admin-to-SAN management, Load Balancing, Server-to-switch, Switch-to-switch, Switch-to-RAID and RAID to backing store. Each of these concerns is addressed separately below.

Admin-to-SAN management may be setup in various ways, including using IP-sec tunneling or other specific configuration. The present invention may be used to detect, report and block administrative commands coming through unauthorized channels or from unauthorized locations by monitoring for the strings corresponding to the administrative commands.

The SAN load balancing function distributes storage and retrieval requests across multiple servers in a SAN, by interpreting the contents of the storage or retrieval commands contained in the network packets. The load-balancing component is mission-critical, and can be a bottleneck due to having to reassemble application-layer traffic to perform application-layer routing decisions. Also, the load-balancing component may be a victim of a denial of service attack by malicious agents or accidental misconfiguration. The present invention can enable most of the application-layer decisions required here without reassembly by monitoring for the strings representative of the storage and retrieval commands, thus significantly reducing the overhead in the load-balancing component.

In the server to switch interface in a SAN, server devices ports are bound to a set of fibrechannel ports using access control lists (ACLs). The configuration and reconfiguration of these ports and ACLs is critical to reliable operation, and in fact to any operation at all. The present invention can advantageously monitor the strings corresponding to the configuration and ACL commands for this interface.

The switch-to-switch interface enables reconfiguration of routing and control, which must be monitored. According to the present invention, one can provide filtering of reconfiguration commands based on matching the corresponding strings, or can provide audit trails and management alerts relating operations monitored. The advantageous scalability of the present invention is critical for monitoring this stage of a SAN, as the switches are incapable of buffering the 2 Gbps or greater traffic loads due to space and time constraints, and thus traditional approaches are impractical.

The switch-to-RAID interface connects the switches to the disk arrays (RAID, for Redundant Array of Inexpensive Disks). This interface is often unprotected in SAN deployments, which may be acceptable in secured locations, but in shared facilities such as collocation and data centers, this interface will require monitoring, reporting and response. The present invention can monitor for strings representing the storage, retrieval and reconfiguration requests.

The backing store to RAID interfaces enables long-term archival storage and backup mechanisms in SAN deployments. The present invention can enable security of this interface by monitoring the backup process for predefined markers in the backup information flow.

The present string matching method is now disclosed. A description of the string matching method is generically described first and then is further described within the context of a flowchart of FIG. 2.

Let u and v be strings. The present invention denotes the length of u by |u| and the concatenation of u and v by u.v.

The present invention assumes a finite language L of bad words with lengths less than or equal to k. It is also assumed the existence of a finite state automaton A to recognize members of L with arbitrary leading and trailing context. The present invention denotes the initial state of A as $initial_A$ and the result of running A on a string d, starting at state c as $run_A(c, d) = <c', m>$ where c' is the new state reached in A and m is the set of matches found.

In the present model, the present invention considers a TCP segment t to be a triple $<a, q, d>$ where a identifies a unique TCP stream, q is the sequence number and d is the data, comprising a string of bytes. The segment t is said to be short if and only if $|d| < k-1$.

For each active TCP stream, the present invention maintains a span set where each span is a 4-tuple $s = <b, l, p, c>$. A span corresponds to a sequence of one or more contiguous TCP segments that have been processed and sent on their way. Here b is the sequence number of the first segment in the sequence, l is the total length in bytes of the data in those segments, p is a prefix comprising a string of up to k−1 bytes from the beginning of the data and c is a state from A. The span s is said to be short if and only if $l < k-1$.

It is convenient to define a family of three functions, join, that take respectively, a span and string, a string and a span, or two spans and return a new span and a set of matches.

Definition 1:

$$\text{join}(<b_1, l_1, p_1, c_1>, d) = <<b_3, l_3, p_3, c_3>, m> \text{ where}$$

$<c_3, m> = run_A(c_1, d)$
$b_3 = b_1$
$l_3 = l_1 + |d|$
$p_3$ is the min(k−1, $|p_1.d|$) byte prefix of $p_1.d$ Definition 2:

$$\text{join}(d, <b_2, l_2, p_2, c_2>) = <<b_3, l_3, p_3, c_3>, m> \text{ where}$$

$<c, m> = run_A(initial_A, d.p_2)$
$b_3 = b_2 - |d|$
$l_3 = |d| + l_2$
$p_3$ is the min(k−1, $|d.p_2|$) byte prefix of $d.p_2$
$c_3 = c$ (if $l_2 < k-1$) or $c_2$ (otherwise)

Definition 3:

$$\text{join}(<b_1, l_1, p_1, c_1>, <b_2, l_2, p_2, c_2>) = <<b_3, l_3, p_3, c_3>, m> \text{ where}$$

$<c, m> = run_A(c_1, p_2)$
$b_3 = b_1$
$l_3 = l_1 + l_2$
$p_3$ is the min(k−1, $|p_1.p_2|$) byte prefix of $p_1.p_2$
$c_3 = c$ (if $l_2 < k-1$) or $c_2$ (otherwise)

When a segment $<a, q, d>$ arrives, the present invention looks in the associated span set to see if the spans $s_p = <b_p, l_p, p_p, c_p>$ immediately preceding the segment, and $s_s = <b_s, l_s, p_s, c_s>$ immediately succeeding the segment exist. The present invention considers the following four cases:

Case 1: Neither $s_p$ nor $s_s$ exist. Let $<c, m> = run_A(initial_A, d)$. The present invention reports matches m and inserts a new span $<q, |d|, p, c>$ into the span set, where p is the min(k−1, |d|) byte prefix of d.

Case 2: $s_p$ exists, $s_s$ does not. This is the usual case, when segments arrive in order. Let $<s, m> = join(s_p, d)$. The present invention reports matches m and replaces $s_p$ with s.

Case 3: $s_s$ exists, $s_p$ does not. Let <s, m>=join(d; $s_s$). The present invention reports matches m and replaces $s_s$ with s.

Case 4: Both $s_p$ and $s_s$ exist. Let <s, m>=join($s_p$, d). Let <s', m'>=join(s, $s_s$). The present invention reports matches m∪m' and replaces both $s_p$ and $s_s$ with s'.

Figure 2:
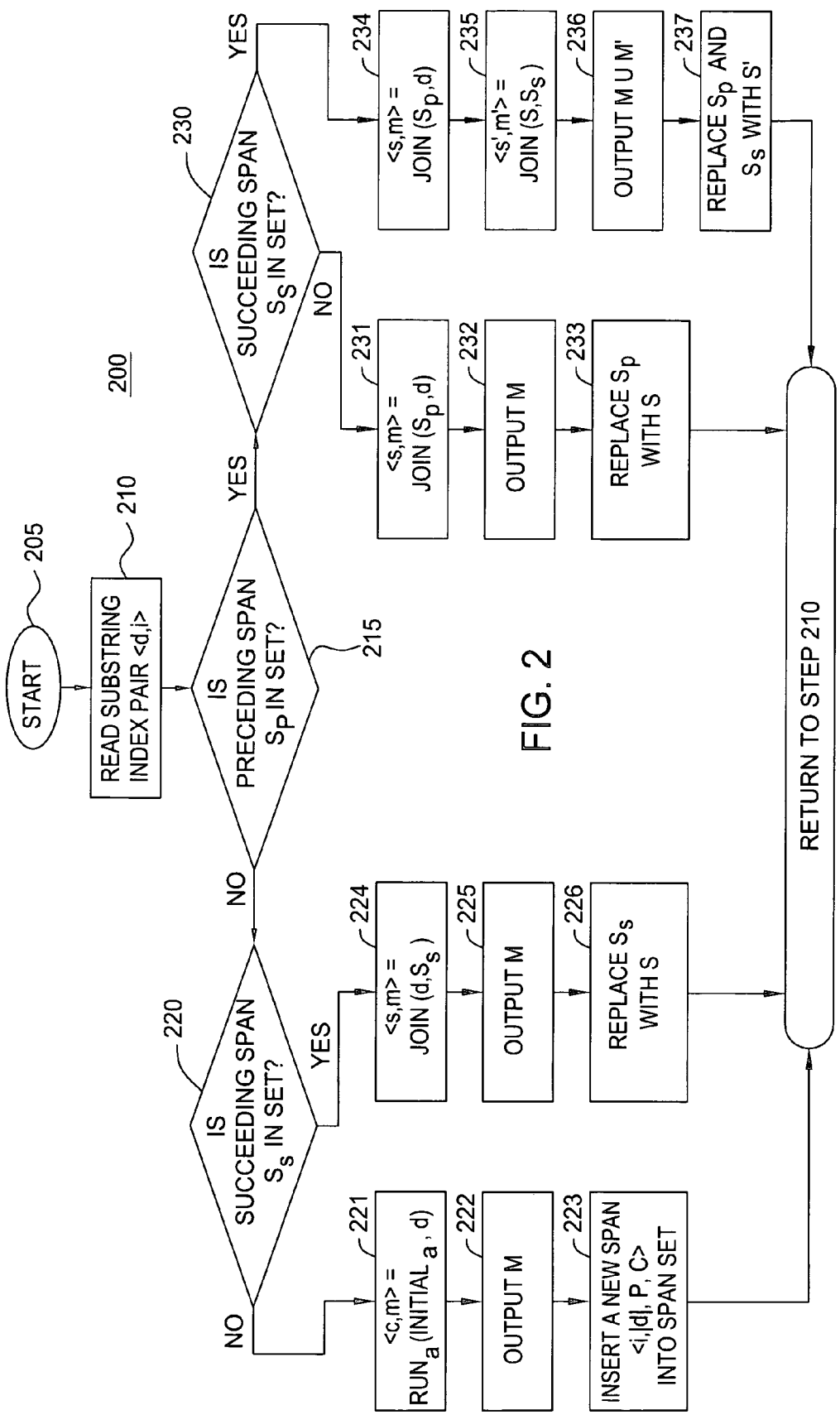
FIG. 2 illustrates a flowchart of method for substring matching.

FIG. 2 illustrates a flowchart of the string matching method 200 as outlined above. Namely, method 200 can be deployed by computing device 120 to effect various string detection implementations as discussed above. Method 200 starts in step 205 proceeds to step 210.

In step 210, method 200 reads a substring index pair <d, i>, where d is the substring and i is broadly defined as an index. It should be noted that although the present invention is disclosed within the context of TCP/IP, the present invention is not limited to a particular protocol. Namely, the present invention can be implemented in conjunction with other communication protocols, e.g., UDP and so on. Thus, a substring should be broadly interpreted as representing a string, a packet, a segment and so on. Similarly, index i should be broadly interpreted as representing a position within a sequence, e.g., a sequence number such as q in the context of TCP/IP.

In step 215, method 200 queries whether a preceding span $s_p$ is in a span set. If the query is negatively answered, then method 200 proceeds to step 220. If the query is positively answered, then method 200 proceeds to step 230.

In step 220, method 200 queries whether a succeeding span $s_s$ is in a span set. If the query is negatively answered, then method 200 proceeds to step 221. If the query is positively answered, then method 200 proceeds to step 224.

In step 221, method 200 having concluded that there are no preceding span $s_p$ and no succeeding span $s_s$, applies the automaton A to output and record any matches m. Method 200 then inserts a new span <i, |d|, p, c> into the span set. It should be noted that steps 221-223 reflects case 1 as discussed above. Method 200 then returns to step 210 for the next substring index pair.

In step 224, method 200 performs a join operation where the substring d is joined with the succeeding span $s_u$. The string matching method of the automaton A is applied and method 200 outputs and records any matches m in step 225. Finally, method 200 replaces the succeeding span $s_u$ with the joined span s. It should be noted that steps 224-226 reflects case 3 as discussed above. Method 200 then returns to step 210 for the next substring index pair.

In step 231, method 200 performs a join operation where the preceding span $s_p$ is joined with the substring d. The string matching method of the automaton A is applied and method 200 outputs and records any matches m in step 232. Finally, method 200 replaces the preceding span $s_p$ with the joined span s. It should be noted that steps 231-233 reflects case 2 as discussed above. Method 200 then returns to step 210 for the next substring index pair.

In step 234, method 200 performs a join operation where the preceding span $s_p$ is joined with the substring d. In step 235, method 200 performs a join operation where the join span s from step 234 is joined with the succeeding span $s_s$. The string matching method of the automaton A is applied and method 200 outputs and records any matches m∪m' in step 236. Finally, method 200 replaces the preceding span $s_p$ and the succeeding span $s_s$ with the joined span s'. It should be noted that steps 234-237 reflects case 4 as discussed above. Method 200 then returns to step 210 for the next substring index pair.

It should be noted that the present substring method broadly describes an approach where substrings are rapidly processed and forwarded without having to store and reassemble all the substrings. Only various parameters of the strings are stored such as the state of the automaton, an index, e.g., a sequence number, a length of the substring and a prefix. These stored parameters will allow the present invention to quickly detect a substring of interest.

It should be noted that the present method assumes that whole TCP segments are received as input. However TCP segments travel the Internet in IP datagrams that can be fragmented and refragmented as dictated by the MTU of the physical networks over which they travel and the fragments themselves may arrive out-of-order.

If it is desired to inspect the TCP header before deciding whether to do string matching on the data in a TCP segment then it may be necessary to perform IP datagram reassembly. However, if it is desired to perform string matching on the contents of all TCP streams, then the present invention can be adapted to work with out-of-order IP datagram fragments.

In one embodiment, the present invention makes the simplifying assumption that the IP fragment with offset 0 contains at least 60 bytes of data following the IP header. This ensures that the TCP header fits completely in this fragment (since TCP headers have a maximum length of 60 bytes) and can be recognized when it arrives.

The source IP address, destination IP address and IP identification fields in the IP fragment header uniquely define which IP datagram each fragment belongs to. For each incomplete datagram, the present invention uses the basic method above at the IP level to maintain a set of spans where each span represents a contiguous sequence if IP fragments. The fragment with offset 0 is handled specially, where the invention extracts the TCP header and does not treat it as data. Any matches found must be stored until the whole datagram has been seen. Once all the fragments for a given IP datagram have been processed, the present invention will be left with a TCP header, a single span and a (possibly empty) list of matches. From the TCP header, the present invention can calculate the position of each match relative to the TCP stream. Using the present method at the TCP level is now slightly more complicated since for each TCP segment, instead of a string of bytes d, there is a span $s_{new}$=<b, l, p, c> where b and l are determined from the TCP header and p and c are from the remaining span at the IP level. The present invention looks in the span set associated with the TCP stream to see if the spans $s_p$=<$b_p$, $l_p$, $p_p$, $c_p$> immediately preceding the segment, and $s_s$=<$b_s$, $l_s$, $p_s$, $c_s$> immediately succeeding the segment exist.

Consider the same 4 cases as above.

Neither $s_p$ nor $s_s$ exist. The present invention adds $s_{new}$ to the span set.

$s_p$ exists, $s_s$ does not. Let <s, m>=join($s_p$, $s_{new}$). The present invention reports matches m and replaces $s_p$ with s.

$s_s$ exists, $s_p$ does not. Let <s, m >=join($s_{new}$, $s_s$). The present invention reports matches m and replaces $s_s$ with s.

Both $s_p$ and $s_s$ exist. Let <s, m>=join($s_p$, $s_{new}$) and <s', m'>=join(s, $s_s$). The present invention reports matches m∪m' and replaces both $s_p$ and $s_s$ with the single span s'.

Note that if one wants to avoid bad words getting through, the present invention should not retransmit the last-to-arrive IP fragment until the TCP level analysis has been completed.

The case where an IP fragment with offset 0 contains fewer than 60 bytes of data will be rare and will often be an indication of an attack. The present invention detects such a situation when either a fragment with offset 0 arrives and it has fewer than 60 data bytes, or when a fragment with offset greater than 0 but less than 60 arrives. At this point the present invention switches to a slower mode of operation where it explicitly reassembles the first 60 bytes of data from the IP datagram in a buffer.

An IP fragment containing data that straddles the 60 byte boundary can be split in two—the data bytes inside the 60 byte boundary go into the buffer while the bytes outside the boundary are processed as usual. When all the fragments have been seen the present invention will have a single span together with a 60 byte buffer. The buffer can be inspected to determine where the TCP header ends and the remaining data bytes from the buffer can be processed as usual to get a final span at the IP level.

Where L is explicitly given, the Aho-Corasick algorithm (see A. Aho and M. Corasick, Efficient String Matching: An Aid to Bibliographic Search, Communications of the ACM 18(6):333-343, June 1975) or similar algorithm can be used to construct an O(m) state automaton where m is the sum of the lengths of the words in L. The running time of the automaton on a string of length n is O(n+j) when j is the number of matches found. A number of algorithms attempt to combine the Boyer-Moore technique (see R. S. Boyer and J S. Moore, A Fast String Searching Algorithm, Communications of the ACM 20(10):762-772, October 1977) with the Aho-Corasick algorithm to obtain a sublinear running time. However such algorithms are more complex and need to test symbols in a nonlinear order. Furthermore, their practical advantage over the Aho-Corasick algorithm evaporates if just one member of L is short. An Aho-Corasick algorithm can be converted to a deterministic finite-state automaton (DFA) in O(m) time. This has the advantage of removing failure arcs that halves the worst-case number of transitions and simplifies the execution. However it has the disadvantage that each state will typically have a larger transition function now that there is a success arc for each symbol in the alphabet.

Where L is given by a regular expression it may be feasible to build a deterministic finite-state automaton for L by classical techniques.

By storing a span set as a balanced binary tree such as a red-black tree (see for example Chaper 14 of Thomas H. Cormen, Charles E. Leierson and Ronald L. Rivest, "Introduction to Algorithms", MIT Press and McGraw Hill, 1990), finding the spans preceding and succeeding a segment, and inserting and deleting-spans can all be done in O(log n) time where n is the number of spans in the set. In practice however, the number spans in a given set is likely to be small so the present invention could choose some cutoff value, C, and regard TCP streams generating more than C spans as an attack on the IDS itself by a knowledgeable attacker. When the number of spans is small, storing the span set as a singly linked list allows for faster operation, especially on today's highly pipelined architectures, since the branches will be more predictable in linked list code than in balanced binary tree code.

An alternative approach to storing the automaton state c in each span set is to instead store a suffix z of length at most k−1. When c is required, for example in a join operation, the present invention can recover it by $<c,m>=run_A(initial_A,z)$, and discard the (already reported) matches m. However, this approach requires more storage than the preferred embodiment already described (if k−1 is greater than the size of the pointer or integer required to store a state), requires more cases to code in the algorithm, and more time.

An Aho-Corasick automaton is essentially a trie with the addition of a failure arc from each state and a (possibly empty) list of matches for each state. The present invention defines the depth of a state as its distance from the root in the underlying trie. In the average case, states of shallow depth tend to have many success arcs in the underlying trie when as states of large depth typically have 0 or 1.

Alternative techniques for representing states include:

1. Represent success arcs as a balanced binary tree of next states with byte value keys.
2. Represent success arcs as an array of 16-bit state numbers indexed by byte values.
3. Represent success arcs as an array of 32-bit state numbers indexed by byte values.
4. Represent success arcs as an array of state pointers indexed by byte values.
5. Use one of 2-4 for "big" states (with more than one success arc) and store a (value, state number/pointer) pair for "small" states (with 0 or 1 success arcs). In the 0 success arc case the value is an out-of-range value to force taking the failure arc without an explicit test for the 0 success arc case.
6. Compile the states to code fragments via C/C++.

Another possibility is to convert the Aho-Corasick automata into a DFA and remove failure arcs altogether. This approach simplifies the inner loop at execution time and removes a potentially unpredictable branch that can hurt performance on modern highly pipelined architectures. The downside is that each state now has a success arc for every byte value so technique 5 above can't be used and techniques 1 and 6 may be very expensive in both time and space.

One optimization that is often applied to DFAs, and that can be applied as an extension of the methods disclosed herein, is that of character class compression. (See Vern Paxon, *Flex—a scanner generator*, March 1995.) For example characters that don't appear in any bad word are indistinguishable for the purpose of matching, and could all be represented by a single byte value.

In one embodiment, the present invention is adapted to address dropped packet attack by monitoring both sides of the TCP communication. Namely, if an attacker can control or predict dropped packets inside the firewall, the attacker may attempt to circumvent the protection by sending a stream with a bad word split across multiple packets. This is followed by sending one of the packets with benign filler. This packet is processed by the firewall, and the whole stream is found to be non-problematic. However, the "filler" packet is then forcibly dropped by the internal network before it is processed by the target machine. The target machine TCP stack then times out, and requests retransmission of the filler packet. The attacker then responds to this request with a packet that has (part of) harmful information. Since the present invention would have already forgotten the state of the other packets surrounding the filler, and the filler packet content, the newly sent packet cannot be properly checked for bad words.

To address this scenario, the present system can monitor both incoming and outgoing traffic on a given connection, e.g., a TCP connection. If there are any packets dropped past the present system, then one can force a reset of the connection, or simply drop "retransmitted" packets. In other words, this feature compares the TCP ACKs to see if there has been any dropped packets behind the present system, and if so, takes appropriate action such as sending a RST to the connection.

This approach should have no appreciable effect on normal traffic in preferred embodiments where the present invention is deployed at or near a firewall in front of a LAN, where packets are almost never dropped in the LAN. However, this approach will advantageously prevent the above-mentioned potential attack mode.

Figure 3:
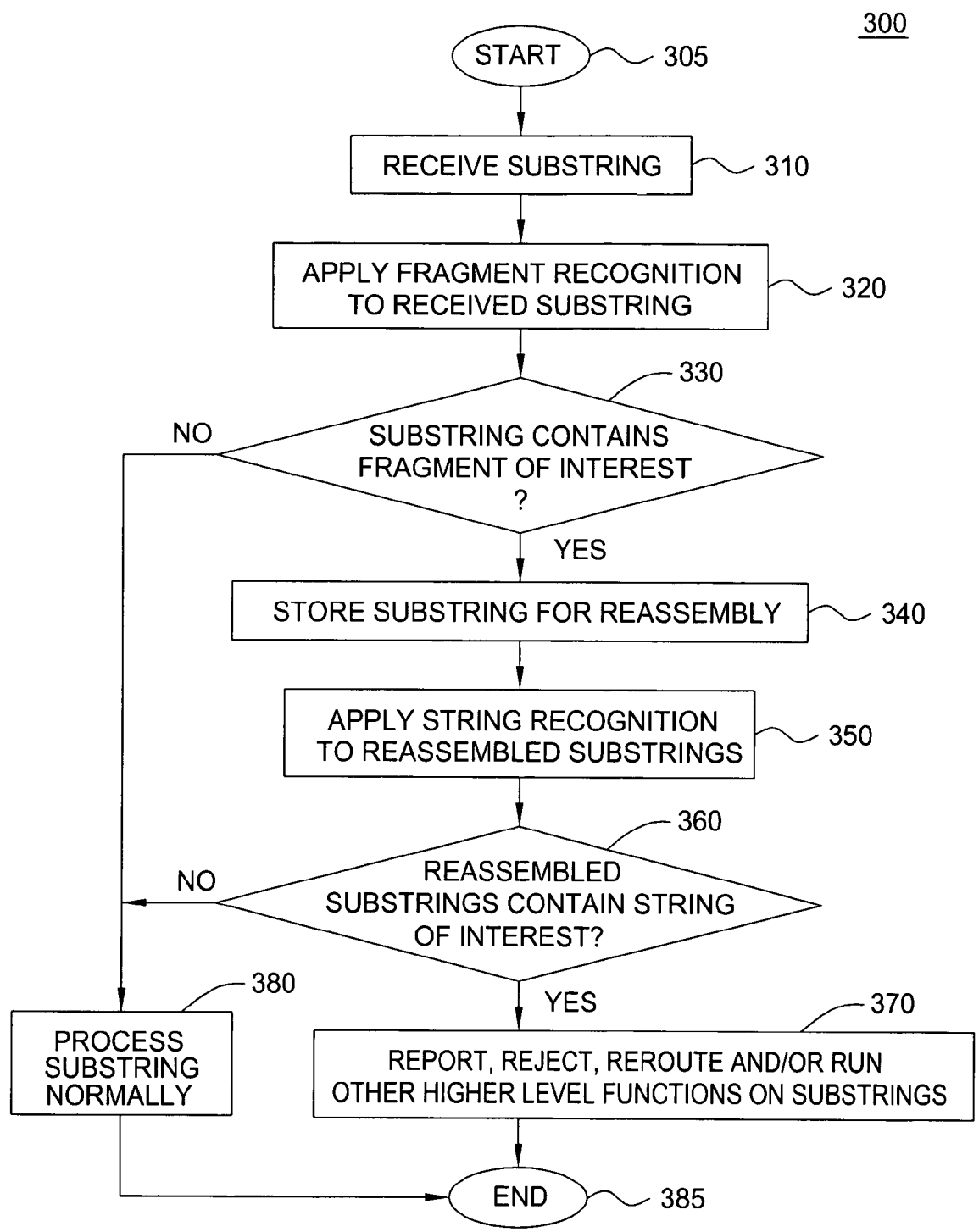
FIG. 3 illustrates a flowchart of method for monitoring and detecting fragments of strings of interest and/or strings of interest in the present invention.

FIG. 3 illustrates a flowchart of method 300 for monitoring and detecting fragments of strings of interest and/or strings of interest in the present invention. More specifically, method 300 can be deployed by computing device 120 to effect various string detection implementations as discussed above plus subsequent processing.

Method 300 starts in step 305 and proceeds to step 310. In step 310, a computing device receives a plurality of substrings, e.g., packets.

In step 320, method 300 applies fragment recognition to the received substrings as discussed in FIG. 2 above.

In step 330, method 300 queries whether fragments of interest have been detected. If the query is affirmatively answered, then method 300 proceeds to step 340. If the query is negatively answered, then method 300 proceeds to step 380, where the received substrings are forwarded and processed normally within a particular implementation context.

In step 340, method 300 stores substrings that contain fragments of interest. These substrings are reassembled or partially assembled to a higher layer.

In step 350, method 300 again applies string recognition to the reassembled substrings as discussed in FIG. 2.

In step 360, method 300 queries whether strings of interest have been detected. If the query is affirmatively answered, then method 300 proceeds to step 370. If the query is negatively answered, then method 300 proceeds to step 380, where the received packets are forwarded and processed normally within a particular implementation context.

In step 370, method 300 may report, reject, reroute, and/or run other higher order functions on the packets carrying strings of interest. Method 300 ends in step 385.

While the foregoing is directed to embodiments of the present invention, other and further embodiments of the invention may be devised without departing from the basic scope thereof, and the scope thereof is determined by the claims that follow.

The invention claimed is:

1. A method for detecting a substring of interest from a plurality of datagrams that arrives out-of-order, comprising:
   receiving a datagram, the datagram comprising a body substring and a header with an index;
   determining whether a preceding span exists in a span set;
   determining whether a succeeding span exists in said span set;
   inserting a new span into said span set when neither a preceding span nor a succeeding span exists, the new span corresponding to said datagram;
   replacing said preceding span with the datagram, when a preceding span exists but a succeeding span does not exist;
   replacing said succeeding span with the datagram, when a succeeding span exists but a preceding span does not exist;
   replacing said preceding span and said succeeding span with a join span comprising said datagram, said preceding span, and said succeeding span, when both a preceding span and a succeeding span exist; and
   applying an automaton having a list of substrings of interest to the body substring of said datagram to determine whether contents of said body substring match one of said substrings of interest.

2. The method of claim 1, wherein said body substring is forwarded, while parameters of said body substring are stored.

3. The method of claim 2, wherein said parameters comprise at least one of: a state of said automaton, said index, a length of the body substring, or a prefix.

4. The method of claim 1, further comprising:
   determining whether said body substring is subsequently dropped by a target machine.

5. The method of claim 4, wherein if said body substring is subsequently dropped, then a connection for passing said body substring is reset.

6. The method of claim 5, wherein said connection is a TCP connection.

7. The method of claim 1, wherein said method for detecting a substring of interest is performed as a network monitoring function.

8. The method of claim 1, wherein said method for detecting a substring of interest is performed as an intrusion detection function.

9. The method of claim 1, wherein said method for detecting a substring of interest is performed as a firewall function.

10. The method of claim 1, wherein said method for detecting a substring of interest is performed as a routing function.

11. The method of claim 1, wherein said method for detecting a substring of interest is performed as a load balancing function.

12. The method of claim 1, wherein said method for detecting a substring of interest is performed as an anti-virus filtering function.

13. The method of claim 1, wherein said method for detecting a substring of interest is performed as an anti-spam filtering function.

14. The method of claim 1, wherein said method for detecting a substring of interest is performed as a document control function.

15. The method of claim 1, wherein said method for detecting a substring of interest is performed as a web content filtering function.

16. The method of claim 1, wherein said method for detecting a substring of interest is performed as a virtual private network monitoring function.

17. The method of claim 1, wherein said method for detecting a substring of interest is performed as a storage area network security function.

18. A computer-readable medium having stored thereon a plurality of instructions, the plurality of instructions including instructions which, when executed by a processor, cause the processor to perform the steps of a method for detecting a substring of interest from a plurality of datagrams that arrives out-of-order, comprising:
   receiving a datagram, the datagram comprising a body substring and a header with an index;
   determining whether a preceding span exists in a span set;
   determining whether a succeeding span exists in said span set;
   inserting a new span into said span set when neither a preceding span nor a succeeding span exists, the new span corresponding to said datagram;
   replacing said preceding span with the datagram, when a preceding span exists but a succeeding span does not exist;
   replacing said succeeding span with the datagram, when a succeeding span exists but a preceding span does not exist;
   replacing said preceding span and said succeeding span with a join span comprising said datagram, said preceding span, and said succeeding span, when both a preceding span and a succeeding span exist; and
   applying an automaton having a list of substrings of interest to the body substring of said datagram to determine whether contents of said body substring match one of said substrings of interest.

19. The computer-readable medium of claim 18, wherein said body substring is forwarded, while parameters of said body substring are stored.

20. The computer-readable medium of claim 19, wherein said parameters comprise at least one of: a state of said automaton, said index, a length of the body substring, or a prefix.

21. The computer-readable medium of claim 18, further comprising:
    determining whether said body substring is subsequently dropped by a target machine.

22. The computer-readable medium of claim 21, wherein if said body substring is subsequently dropped, then a connection for passing said body substring is reset.

23. The computer-readable medium of claim 22, wherein said connection is a TCP connection.

24. The computer-readable medium of claim 18, wherein said method for detecting a substring of interest is performed as a network monitoring function.

25. The computer-readable medium of claim 18, wherein said method for detecting a substring of interest is performed as an intrusion detection function.

26. The computer-readable medium of claim 18, wherein said method for detecting a substring of interest is performed as a firewall function.

27. The computer-readable medium of claim 18, wherein said method for detecting a substring of interest is performed as a routing function.

28. The computer-readable medium of claim 18, wherein said method for detecting a substring of interest is performed as a load balancing function.

29. The computer-readable medium of claim 18, wherein said method for detecting a substring of interest is performed as an anti-virus filtering function.

30. The computer-readable medium of claim 18, wherein said method for detecting a substring of interest is performed as an anti-spam filtering function.

31. The computer-readable medium of claim 18, wherein said method for detecting a substring of interest is performed as a document control function.

32. The computer-readable medium of claim 18, wherein said method for detecting a substring of interest is performed as a web content filtering function.

33. The computer-readable medium of claim 18, wherein said method for detecting a substring of interest is performed as a virtual private network monitoring function.

34. The computer-readable medium of claim 18, wherein said method for detecting a substring of interest is performed as a storage area network security function.

35. An apparatus for detecting a substring of interest from a plurality of datagrams that arrives out-of-order, comprising:
    means for receiving a datagram, the datagram comprising a body substring and a header with an index;
    means for determining whether a preceding span exists in a span set;
    means for determining whether a succeeding span exists in said span set;
    means for inserting a new span into said span set when neither a preceding span nor a succeeding span exists, the new span corresponding to said datagram;
    means for replacing said preceding span with the datagram, when a preceding span exists but a succeeding span does not exist;
    means for replacing said succeeding span with the datagram, when a succeeding span exists but a preceding span does not exist;
    means for replacing said preceding span and said succeeding span with a join span comprising said datagram, said preceding span, and said succeeding span, when both a preceding span and a succeeding span exist; and
    means for applying an automaton having a list of substrings of interest to the body substring of said datagram to determine whether contents of said body substring match one of said substrings of interest.

36. The apparatus of claim 35, further comprising:
    means for forwarding said body substring; and
    means for storing parameters of said body substring.

37. The apparatus of claim 36, wherein said parameters comprise at least one of: a state of said automaton, said index, a length of the body substring, or a prefix.

38. The apparatus of claim 35, further comprising:
    means for determining whether said body substring is subsequently dropped by a target machine.

39. The apparatus of claim 38, further comprising:
    means for re-selling a connection for passing said body substring when said body substring is subsequently dropped.

40. The apparatus of claim 39, wherein said connection is a TCP connection.

41. The apparatus of claim 35, wherein said apparatus for detecting a substring of interest is implemented as a network monitoring system.

42. The apparatus of claim 35, wherein said apparatus for detecting a substring of interest is implemented as an intrusion detection system.

43. The apparatus of claim 35, wherein said apparatus for detecting a substring of interest is implemented as a firewall system.

44. The apparatus of claim 35, wherein said apparatus for detecting a substring of interest is implemented as a routing system.

45. The apparatus of claim 35, wherein said apparatus for detecting a substring of interest is implemented as a load balancing system.

46. The apparatus of claim 35, wherein said apparatus for detecting a substring of interest is implemented as an anti-virus filtering system.

47. The apparatus of claim 35, wherein said apparatus for detecting a substring of interest is implemented as an anti-spam filtering system.

48. The apparatus of claim 35, wherein said apparatus for detecting a substring of interest is implemented as a document control system.

49. The apparatus of claim 35, wherein said apparatus for detecting a substring of interest is implemented as a web content filtering system.

50. The apparatus of claim 35, wherein said apparatus for detecting a substring of interest is implemented as a virtual private network monitoring system.

51. The apparatus of claim 35, wherein said apparatus for detecting a substring of interest is implemented as a storage area network security system.

\* \* \* \* \*